(12) United States Patent
Itoh

(10) Patent No.: US 11,599,965 B2
(45) Date of Patent: Mar. 7, 2023

(54) INFORMATION PROCESSING DEVICE FOR PAYMENT AUTHENTICATION AND PAYMENT SELECTION

(71) Applicant: TOYOTA JIDOSHA KABUSHIKI KAISHA, Toyota (JP)

(72) Inventor: Shoji Itoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 17/222,290

(22) Filed: Apr. 5, 2021

(65) Prior Publication Data

US 2021/0390651 A1     Dec. 16, 2021

(30) Foreign Application Priority Data

Jun. 16, 2020   (JP) .............................. JP2020-103867

(51) Int. Cl.
*G06Q 50/30*   (2012.01)
*G06Q 20/40*   (2012.01)

(52) U.S. Cl.
CPC ............ *G06Q 50/30* (2013.01); *G06Q 20/40* (2013.01); *G06Q 20/4014* (2013.01); *G06Q 2240/00* (2013.01)

(58) Field of Classification Search
CPC .... G06Q 50/30; G06Q 20/40; G06Q 20/4014; G06Q 2240/00
See application file for complete search history.

(56) References Cited

U.S. PATENT DOCUMENTS

| | | | |
|---|---|---|---|
| 11,062,300 B1* | 7/2021 | Sridharan | G06Q 10/025 |
| 2018/0130160 A1* | 5/2018 | Alexander | G06Q 20/12 |
| 2021/0174334 A1* | 6/2021 | Valencia | G06Q 20/3278 |

FOREIGN PATENT DOCUMENTS

JP        2020-017095 A        1/2020

OTHER PUBLICATIONS

"How to Setup a No Contact, Virtual Parking Permit System for a Post-COVID-19 World," Apr. 24, 2020, https://blog.airgarage.com/posts/virtual-permit-system (Year: 2020).*

* cited by examiner

*Primary Examiner* — Resha Desai
*Assistant Examiner* — Michelle E Carey
(74) *Attorney, Agent, or Firm* — Oliff PLC

(57) ABSTRACT

An information processing device includes a reception unit that receives moving process information indicating a moving process including a transportation and a commercial facility to be used by a user, and a generation unit that generates authentication information that is commonly usable at the transportation and the commercial facility to be used by the user in accordance with the moving process and is used for authenticating the user.

1 Claim, 2 Drawing Sheets

INFORMATION PROCESSING DEVICE FOR PAYMENT AUTHENTICATION AND PAYMENT SELECTION

CROSS-REFERENCE TO RELATED APPLICATION

This application claims priority to Japanese Patent Application No. 2020-103867 filed on Jun. 16, 2020, incorporated herein by reference in its entirety.

BACKGROUND

1. Technical Field

The disclosure relates to an information processing device.

2. Description of Related Art

Japanese Unexamined Patent Application Publication No. 2020-017095 (JP 2020-017095 A) discloses an information processing system that, when the system receives a request from a user to use a travel planning function, extracts reserved information associated with an identifier that identifies the user from a storage unit and reflects the extracted reserved information in a screen that displays a travel plan.

SUMMARY

In the related art, a user acquires moving process information indicating a moving process including a transportation and a commercial facility used in a travel plan by selecting the travel plan provided by a travel agency, for example. When the user uses the transportation and the commercial facility in accordance with the moving process above, the user needs to manage tickets for each transportation and commercial facility used, and there is room for improvement from the viewpoint of reducing time and effort of the user.

The disclosure has been made in consideration of the above fact, and an object of the disclosure is to reduce time and effort of the user when the user uses the transportation and the commercial facility.

An information processing device according to an aspect of this disclosure includes: a reception unit that receives moving process information indicating a moving process including a transportation and a commercial facility to be used by a user; and a generation unit that generates authentication information that is commonly usable at the transportation and the commercial facility to be used by the user in accordance with the moving process and is used for authenticating the user.

According to the above aspect, the moving process information indicating the moving process including the transportation and the commercial facility to be used by a user is received, and the authentication information that is commonly usable at the transportation and the commercial facility to be used by the user in accordance with the moving process and is used for authenticating the user is generated.

Therefore, the user can use the transportation and the commercial facility by presenting single authentication information. This makes it possible for the user to reduce time and effort when the user uses the transportation and the commercial facility.

In the information processing device according to the above aspect, the information processing device may further include an output unit that outputs, when the user is authenticated using the authentication information at at least one of the transportation and the commercial facility, a payment request for making a payment of a usage fee of the at least one of the transportation and the commercial facility that authenticates the user, in accordance with a payment method associated with the user.

Thus, the user can make a payment simultaneously with authentication of the user. This makes it possible for the user to reduce time and effort when the user makes a payment.

In the information processing device having the above configuration, when a plurality of the payment methods is associated with the user, the output unit may output the payment request in accordance with the payment method that is available at each of the transportation and the commercial facility at which the user is authenticated, from the payment methods.

Thus, the user does not need to select the payment method in accordance with the transportation and the commercial facility to be used by the user. This makes it possible for the user to reduce time and effort for making a payment.

In the information processing device having the above configuration, in at least one of a case where the user moves to the commercial facility using the transportation provided by the commercial facility, and a case where the user moves from the commercial facility to another location, the output unit may output the payment request for making a payment of the usage fee of the commercial facility only, among the commercial facility and the transportation.

According to the above configuration, time and effort of the commercial facility to execute processing for bearing the usage fee of the transportation can be reduced.

According to the disclosure, an effect that time and effort when the user uses the transportation and the commercial facility can be reduced can be achieved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, examples of an embodiment for carrying out the disclosure will be described in detail with reference to the drawings.

Figure 1:
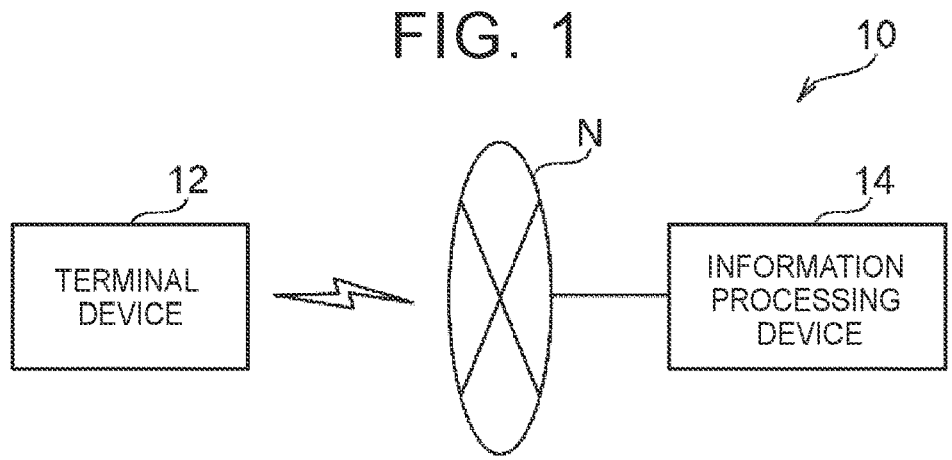
FIG. 1 is a block diagram showing an example of a configuration of an information processing system.

First, a configuration of an information processing system 10 according to the embodiment will be described with reference to FIG. 1. As shown in FIG. 1, the information processing system 10 includes a terminal device 12 and an information processing device 14. The terminal device 12 and the information processing device 14 are communicable with each other via a network N. The terminal device 12 is a device used by the user. An example of the terminal device 12 includes a mobile terminal such as a smartphone.

Figure 2:
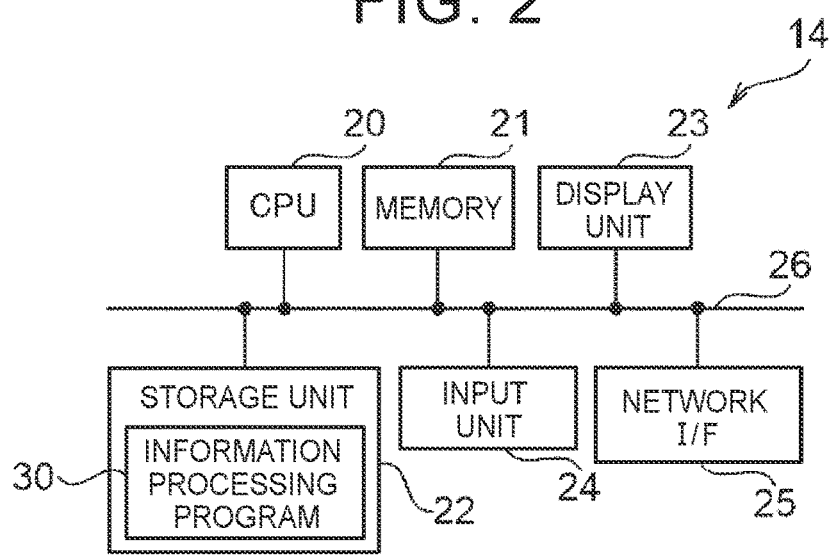
FIG. 2 is a block diagram showing an example of a hardware configuration of an information processing device.

Next, a hardware configuration of the information processing device 14 according to the embodiment will be described with reference to FIG. 2. As shown in FIG. 2, the information processing device 14 includes a central processing unit (CPU) 20, a memory 21 as a temporary storage area, and a non-volatile storage unit 22. Further, the information processing device 14 includes a display unit 23 such as a liquid crystal display, an input unit 24 such as a keyboard and a mouse, and a network interface (I/F) 25 connected to the network N. The CPU 20, the memory 21, the storage unit 22, the display unit 23, the input unit 24, and the network I/F 25 are connected to a bus 26. An example of the information processing device 14 includes a server computer.

The storage unit 22 is realized by a hard disk drive (HDD), a solid state drive (SSD), or a flash memory, etc. An information processing program 30 is stored in the storage unit 22 serving as a storage medium. The CPU 20 reads the information processing program 30 from the storage unit 22, load the program into the memory 21, and executes the loaded information processing program 30.

A user who uses the information processing system 10 registers in advance a payment method for paying usage fees for a transportation and a commercial facility, etc. Examples of the payment method above include payment by a credit card, code payment such as payment by a QR code (registered trademark), and payment by a transportation system integrated circuit (IC) card. The payment method registered by the user is associated with the user and stored in the storage unit 22.

Figure 3:
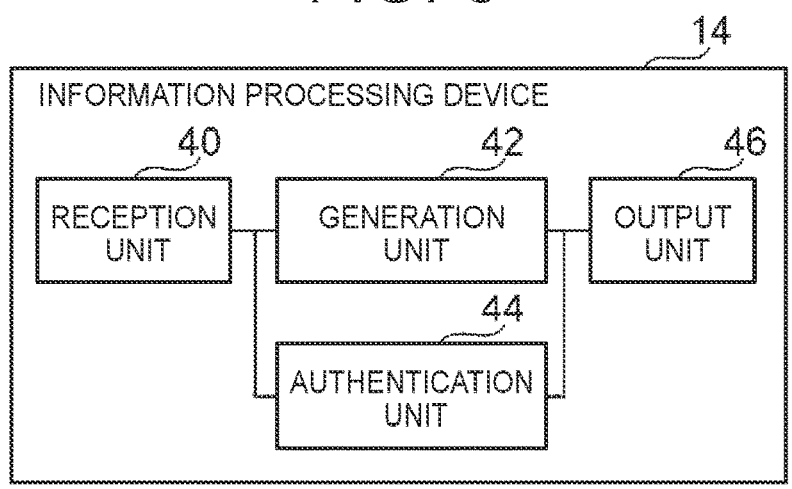
FIG. 3 is a block diagram showing an example of a functional configuration of the information processing device.

Next, a functional configuration of the information processing device 14 according to the embodiment will be described with reference to FIG. 3. As shown in FIG. 3, the information processing device 14 includes a reception unit 40, a generation unit 42, an authentication unit 44, and an output unit 46. When the CPU 20 of the information processing device 14 executes the information processing program 30, the CPU 20 functions as the reception unit 40, the generation unit 42, the authentication unit 44, and the output unit 46.

The user selects a desired moving process from a plurality of moving processes including the transportation and the commercial facility used by the user, by operating the terminal device 12, for example. Moving process information indicating the moving process selected by the user is transmitted from the terminal device 12 to the information processing device 14. The reception unit 40 receives the moving process information transmitted from the terminal device 12 to the information processing device 14. Examples of the moving process include a travel plan provided by a travel agency. Further, examples of the transportation include trains, buses, and taxis. In addition, examples of the commercial facility include facilities such as amusement parks, accommodation facilities, department stores, restaurants, and museums that require authentication at the time of entry of the user or purchase of products by the user.

Further, the reception unit 40 receives data (hereinafter referred to as a "code data") that is acquired in such a manner that a reader provided at the transportation and the commercial facility reads the QR code, which is an example of authentication information to be described later, displayed on the display of the terminal device 12 at the transportation and the commercial facility and that is transmitted from the reader above to the information processing device 14. The code data also includes usage fees for the corresponding transportation and commercial facility. The reception unit 40 also receives the usage fees. Examples of the usage fees above include transportation fees, admission fees for the commercial facility, and fees for products purchased at the commercial facility.

The generation unit 42 generates the QR code that is commonly usable at the transportation and the commercial facility to be used by the user in accordance with the moving process indicated by the moving process information received by the reception unit 40 and that is an example of the authentication information for authenticating the user. A generation method of the authentication information above is not particularly limited as long as the user can be uniquely identified. For example, information generated based on a unique user ID (identifier) in the information processing system 10 may be used as the authentication information. Further, the generation unit 42 stores the code data indicated by the generated QR code in the storage unit 22 in association with the user.

The authentication unit 44 executes user authentication processing based on the code data received by the reception unit 40. Specifically, the authentication unit 44 authenticates the user when the code data received by the reception unit 40 is stored in the storage unit 22. Further, the authentication unit 44 does not authenticate the user when the code data received by the reception unit 40 is not stored in the storage unit 22.

The output unit 46 outputs (transmits) the QR code generated by the generation unit 42 to the terminal device 12. When the user is authenticated by the authentication unit 44, the output unit 46 refers to the storage unit 22 and outputs, to a payment service provider, a payment request for making a payment of the usage fee for the transportation or the commercial facility that authenticates the user in accordance with the payment method associated with the user. The transportation or the commercial facility that authenticates the user herein means the transportation or the commercial facility from which the code data described above is transmitted. Further, the payment service provider herein means, for example, a system of a credit card company when the payment method associated with the user is payment by the credit card. The authentication processing is executed by the authentication unit 44 and payment request output processing is executed by the output unit 46 every time the user presents the QR code and the QR code is read at the transportation or the commercial facility. Further, the output unit 46 outputs an authentication result by the authentication unit 44 to the transportation or the commercial facility from which the code data is transmitted.

Next, operations of the information processing device 14 according to the embodiment will be described with reference to FIGS. 4 and 5. The authentication information generation processing shown in FIG. 4 and the authentication processing shown in FIG. 5 are executed in a manner such that the CPU 20 of the information processing device 14 executes the information processing program 30. The authentication information generation processing shown in FIG. 4 is executed when an execution command is input by the user via the terminal device 12.

Figure 4:
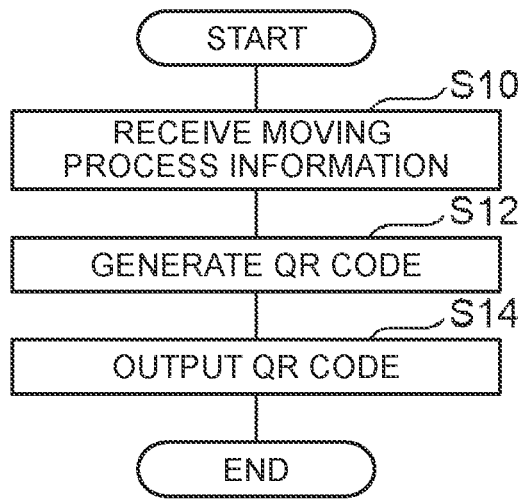
FIG. 4 is a flowchart showing an example of authentication information generation processing.
Figure 5:
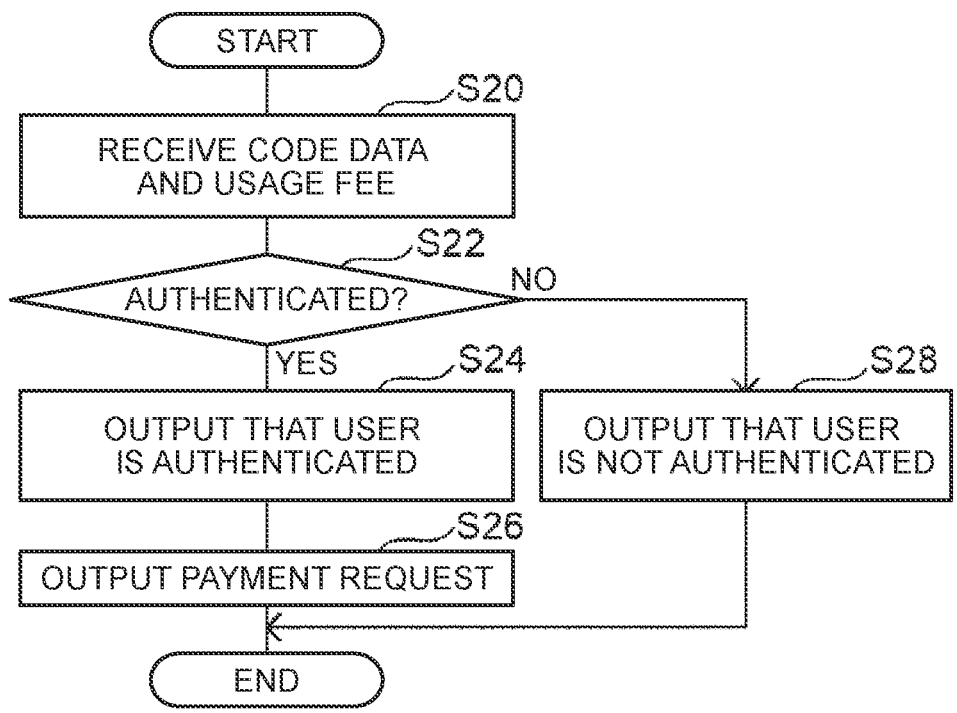
FIG. 5 is a flowchart showing an example of authentication processing.

In step S10 shown in FIG. 4, the reception unit 40 receives the moving process information transmitted from the terminal device 12 to the information processing device 14 as described above. In step S12, as described above, the generation unit 42 generates the QR code that is commonly usable at the transportation and the commercial facility to be used by the user in accordance with the moving process indicated by the moving process information received by the reception unit 40 in step S10 and that is an example of the authentication information for authenticating the user. Further, the generation unit 42 stores the code data indicated by the generated QR code in the storage unit 22 in association with the user.

In step S14, the output unit 46 outputs the QR code generated in step S12 to the terminal device 12 as described above. When the processing in step S14 is completed, the authentication information generation processing ends.

The user presents the QR code generated in the authentication information generation processing shown in FIG. 4 by displaying the QR code on the display of the terminal device 12 at the transportation and the commercial facility. At the transportation and the commercial facility, the presented QR code is read by a reader such as a QR code reader, and the code data acquired is transmitted to the information processing device 14. When the information processing device 14 receives the code data transmitted from the transportation and the commercial facility, the authentication processing shown in FIG. 5 is executed.

In step S20 shown in FIG. 5, the reception unit 40 receives the code data transmitted to the information processing device 14 and the usage fee attached to the code data, as described above. In step S22, the authentication unit 44 executes the user authentication processing based on the code data received in step S20, as described above. When the user is authenticated by the authentication unit 44, a positive determination is made in step S22, and the processing proceeds to step S24.

In step S24, the output unit 46 outputs (transmits) information indicating that the user is authenticated to the transportation or the commercial facility from which the code data received in step S20 is transmitted. In step S26, as described above, the output unit 46 refers to the storage unit 22 and outputs, to the payment service provider, the payment request for making a payment of the usage fee of the transportation or the commercial facility that authenticates the user, in accordance with the payment method associated with the user authenticated in step S22. When the processing in step S26 is completed, the authentication processing ends.

On the other hand, when the user is not authenticated by the authentication unit 44 in step S22, a negative determination is made in step S22, and the processing proceeds to step S28. In step S28, the output unit 46 outputs (transmits) information indicating that the user is not authenticated to the transportation or the commercial facility from which the code data received in step S20 is transmitted. When the processing in step S28 is completed, the authentication processing ends.

As described above, according to the embodiment, the user can use the transportation and the commercial facility by presenting single authentication information (the QR code in the embodiment). This makes it possible for the user to reduce time and effort when the user uses the transportation and the commercial facility.

In the above embodiment, when a plurality of payment methods is associated with the user, the output unit 46 may output the payment request in accordance with the payment method that is available at each of the transportation and the commercial facility at which the user is authenticated, from the payment methods. For example, a case where the user is associated with the payment by the transportation system IC card and the payment by the QR code, the payment by the transportation system IC card is available at a transportation A, and the payment by the QR code is available at a commercial facility B will be described. In this case, in addition to the conditions above, when the user presents the QR code as an example of the above authentication information at the transportation A, the output unit 46 outputs the payment request for making a payment using the transportation system IC card incorporated in the terminal device 12 as the QR code is read. Further, in this case, in addition to the conditions above, when the user presents the QR code as an example of the above authentication information at the commercial facility B, the output unit 46 outputs the payment request for making a payment using a QR code payment application incorporated in the terminal device 12 as the QR code is read. With the processing above, the user does not need to select the payment method in accordance with the transportation and the commercial facility to be used by the user. This makes it possible for the user to reduce time and effort for making a payment.

Further, in the above embodiment, in at least one of a case where the user moves to the commercial facility using a transportation provided by the commercial facility, and a case where the user moves from the commercial facility to another location, the output unit 46 may output the payment request for making a payment of the usage fee of the commercial facility only of the commercial facility and the transportation. For example, a case where a restaurant as an example of the commercial facility provides a shared bus as an example of the transportation will be described. In this case, the user presents the QR code as an example of the above authentication information and boards on the shared bus, and moves to the restaurant. Further, in this case, the user eats and drinks at the restaurant and presents the QR code as an example of the above authentication information at the time of payment. Further, the user presents the QR code as an example of the above authentication information and boards on the shared bus, and moves from the restaurant to another location. In this case, the output unit 46 outputs the payment request for making a payment of the usage fee of the restaurant only of the restaurant and the transportation.

Further, in the above embodiment, the case where one-step authentication using the QR code as an example of the authentication information is executed has been described. However, the disclosure is not limited to this. For example, two-step authentication may be executed. In this case, a mode in which, as first-stage authentication, authentication using the QR code is executed as in the above embodiment, and as second-stage authentication, authentication using a personal identification number or a password is executed is exemplified.

Further, in the above embodiment, the case where the QR code is applied as the authentication information has been described. However, the disclosure is not limited to this. For example, a barcode may be applied as the authentication information. Further, for example, information used for biometric authentications, such as facial recognition, iris recognition, and fingerprint authentication, may be applied as the authentication information. For example, in the case of facial recognition, information indicating a plurality of feature points extracted from an image obtained by capturing a face of the user can be applied as the authentication information.

Further, in the above embodiment, the case where the user inputs the moving process subject to the processing by selecting the travel plan has been described. However, the disclosure is not limited to this. For example, the user may input a departure point, a waypoint, and a destination, and the transportation and commercial facility acquired by a route search using the input may be subject to the processing.

Further, the processing executed by the CPU 20 in the above embodiment has been described as software processing executed by executing the program. However, the processing executed by the CPU 20 may be processing executed by hardware such as an application-specific integrated circuit (ASIC) and a field-programmable gate array (FPGA). Further, the processing executed by the CPU 20 may be processing executed in combination of software and hardware. Further, the information processing program 30 stored in the storage unit 22 may be stored in various storage media and distributed.

Furthermore, the disclosure is not limited to the above embodiment, and it goes without saying that the disclosure can be variously modified and implemented within the scope thereof in addition to the above embodiment.

What is claimed is:

1. An information processing device, comprising a processor configured to:
   receive moving process information indicating a moving process including a transportation and a commercial facility to be used by a user;
   generate authentication information that is commonly readable by a reader of each of the transportation and the commercial facility to be used by the user in accordance with the moving process, the authentication information being used for authenticating the user;
   output the authentication information readable by the reader to a mobile terminal used by the user;
   when the user is authenticated, using the authentication information, at either the transportation or the commercial facility, output, to a payment service provider, a payment request for making a payment of a usage fee of the of the transportation or the commercial facility that authenticates the user, in accordance with a plurality of payment methods associated with the user; and
   when the user uses the transportation provided by the commercial facility for at least one of a movement to the commercial facility and a movement from the commercial facility, output, based on the authentication information read by the reader of the commercial facility and the reader of the transportation, the payment request for making the payment of the usage fee including a fee for the commercial facility and excluding a fee for the transportation, wherein:
   a payment by a transportation system integrated circuit (IC) card and a payment by a quick response (QR) code payment application are associated with the user as the payment methods, and
   the processor is configured to:
      output the payment request for making the payment using the transportation system IC card incorporated in the mobile terminal when the reader of the transportation reads the authentication information, and
      output the payment request for making the payment using the QR code payment application incorporated in the mobile terminal when the reader of the commercial facility reads the authentication information.

* * * * *